July 14, 1936.　　　　S. E. SLOSS　　　　2,047,440
RADIO ADVERTISING MEANS
Filed Nov. 10, 1933　　　2 Sheets-Sheet 1
*Fig. 1.*
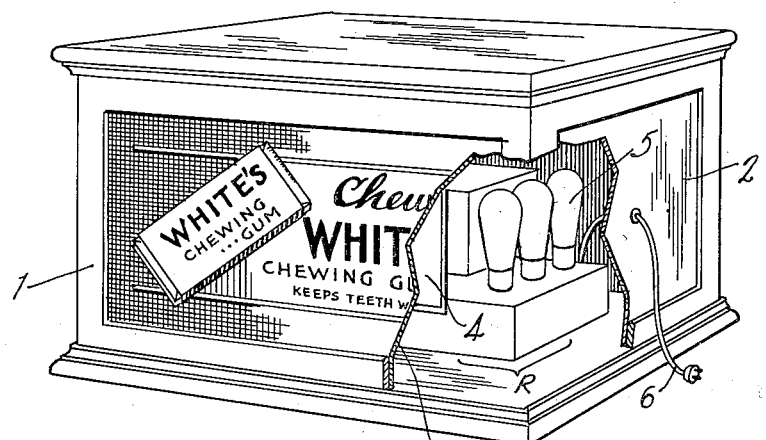
*Fig. 2.*
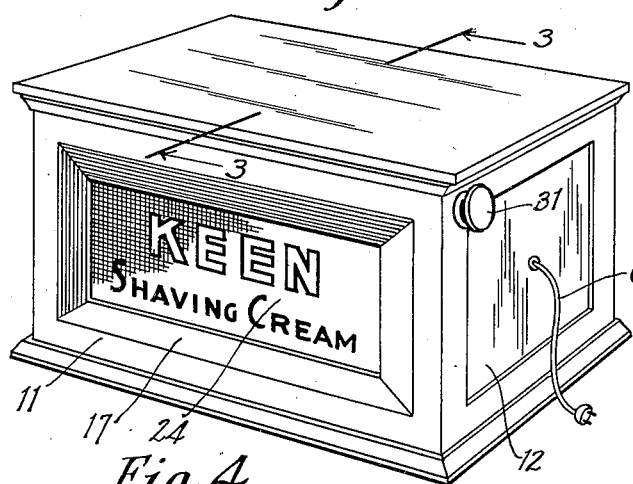
*Fig. 3.*
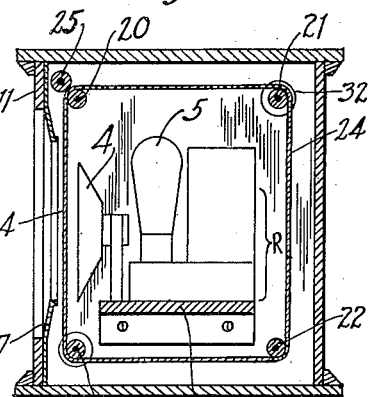
*Fig. 4.*　　*Fig. 5.*
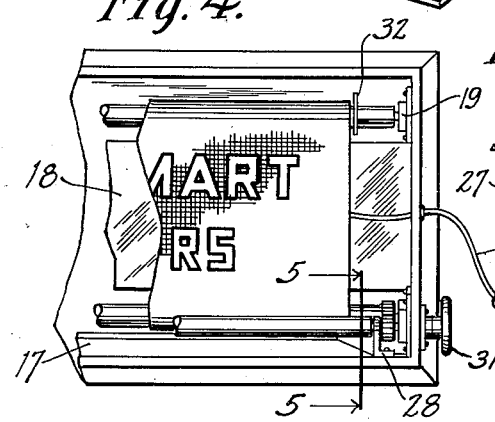
Inventor
Stanley E. Sloss
By W. E. Sherwood
Attorney Patented July 14, 1936

2,047,440

UNITED STATES PATENT OFFICE 2,047,440

RADIO ADVERTISING MEANS

Stanley E. Sloss, Louisville, Ky.

Application November 10, 1933, Serial No. 697,414

3 Claims. (Cl. 40—28)

This invention relates to radio advertising means embodying a new and improved radio cabinet structure and it has particular relation to cabinets which are used for housing radio receiving sets. One important object of the invention is to provide a radio advertising means having both a visual and an audible advertising function. More particularly, it relates to a special form of cabinet which houses a radio set which is adapted to receive only a predetermined broadcast program. The joint use of my improved cabinet structure and a radio receiving set adapted for advertising purposes is to be understood as being within the purview of this invention. In this respect the invention discloses a means for carrying out a definite radio advertising project through the conjoint use of a pretuned receiving set providing audible advertising and a cabinet especially constructed for such set and providing complementary visual advertising.

The use of isolated, pretuned radio receiving sets for advertising purposes has already been proposed, but so far as can be learned such proposal has never been developed with respect to a small portable radio set which can be used in the listener's home or office. By the teaching of the present invention, it becomes possible to provide an inexpensive radio set which by virtue of its advertising appeal can be furnished to a prospective buyer of the advertisers product at little or no cost to him. Moreover, with my improved radio set and cabinet, such prospective customer will be compelled to listen to such programs as the donor wishes him to hear. At the same time there will be before the listener at all times a constant reminder of the product advertised in the form of an attractive, dignified advertising screen or panel as will be more fully explained hereinafter.

Due to recent improvements in refining radio receiving sets and in the methods of manufacturing the same it is now possible to obtain small, compact sets which are inexpensive and have satisfactory reception qualities. Sets of this type could be given away free by advertisers if it were possible to compel the user to use them them for the purpose intended, namely, to listen to the advertisers' programs at all times when the set is in use.

In the conventional radio receiving set a plurality of external connections are provided. Such connections comprise a cord connecting the set to a source of electrical energy, an aerial connection, a ground connection, a switch, a volume control and a station selector control. These external connections necessitate the use of apertured sides of the radio cabinet and preclude or at least render complicated any use of a movable advertising device on the cabinet.

Another object of the present invention is to provide a radio cabinet having an advertising device housed within the cabinet and free to move without interference with the external connections of the radio set.

Another object is to provide a radio cabinet having an advertising device housed therein and also housing a pretuned radio receiving set which requires a minimum of external connections.

A further object is to provide a radio cabinet adapted for advertising purposes together with a radio receiving set which can be used only for listening to a broadcasting station which provides advertising similar to that shown on the cabinet.

Other objects and advantages of the invention will become apparent in the course of the following description considered in connection with the accompanying drawings.

In said drawings Figure 1 is a perspective view of the radio cabinet, partially broken away to show the location of the enclosed radio receiving set;

Fig. 2 is a perspective view of the cabinet provided with a movable advertising means;

Fig. 3 is a section taken on line 3—3 of Fig. 2;

Fig. 4 is a plan view of the cabinet shown in Fig. 2 with the cabinet top removed;

Fig. 5 is a section taken on line 5—5 of Fig. 4;

Figure 6:
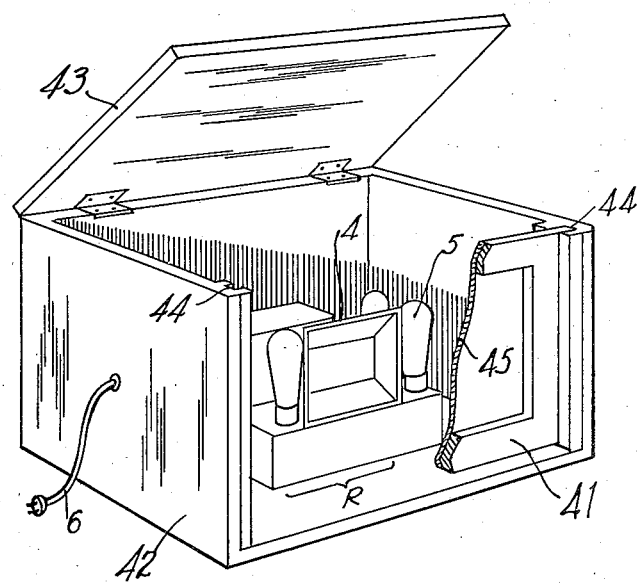
Fig. 6 is a perspective view of a modified form of cabinet partially broken away to show the location of the radio receiving set and the removable front panel member; and—
Figure 7:
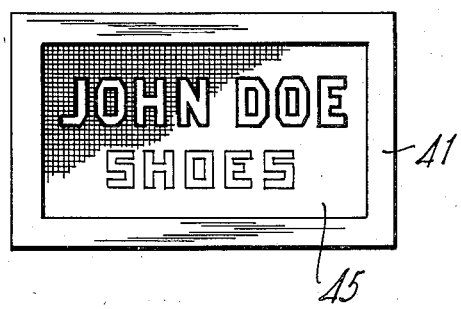
Fig. 7 is an elevation view of the panel used in the cabinet shown by Fig. 6.

In Fig. 1 there is shown a radio cabinet comprising a front wall 1 having a rectangular aperture therein and a side wall 2 having therein a single, small opening for the reception of all of the external connections from the enclosed radio set. Complementary top, bottom, rear and side walls having no openings therein are joined together in any convenient manner to complete the cabinet structure.

Affixed to the front wall 1 and covering the aperture therein is a screen 3 on which may be inscribed any desired advertising matter, such as slogans, illustrations, reminders or the like. In order to display this advertising matter to best advantage it may be placed on the surface of a silk screen with certain portions of the screen made translucent so that it can be illuminated from a source of light within the cabinet. The presence of such a screen will not interfere with sound coming from within the cabinet.

Enclosed within the cabinet is a radio chassis indicated generally by R and embodying a speaker element 4 arranged behind the screen 3, a plurality of tubes 5 and a single external connection cord 6. The radio chassis R is adapted to rest on the bottom of the cabinet and to be held there securely by any suitable means (not shown).

This radio receiving set differs from the conventional set only in that its circuit is pretuned and the reception of the set is limited therefore to the program of a predetermined broadcasting station. For the purposes for which it is intended the provision of a station selector, a volume control, an aerial connection, a ground connection and a separate switch becomes unnecessary and may be omitted. Consequently, the sole external connection is the cord 6 supplying energy to the tubes 5 and when the set is to be placed in operation the user merely connects the cord 6 to any suitable energy outlet. Should it become desirable to embody a ground, aerial or volume control connection at any time in this radio set, such could readily be incorporated into the cord 6.

Figure 2 illustrates the invention as embodied in a cabinet which houses an advertising device carrying a series of advertisements. In the cabinet shown 11 represents a front wall having an aperture therein through which sound may pass from the cabinet. As more clearly shown in Figures 3 and 4 there is affixed to the wall 11 a member 17 extending inwardly of the cabinet and converging toward the center of the cabinet. This member 17, whose function is set forth hereinafter, is provided with an aperture which is similar to that of wall 11 but is smaller. An end wall 12 provides a single, small opening for the external connections of the enclosed radio set. As in Fig. 1, the same type of radio set is used and the parts are designated by the same references. In the type of cabinet shown in Fig. 2 however, the radio chassis is adapted to rest upon a raised platform or support 18 which is fastened to the end walls of the cabinet in any suitable manner and provides an open space between the bottom of the support 18 and the bottom of the cabinet.

Mounted in bearings 19 fastened to the end walls of the cabinet and free to turn in said bearings are a series of rollers 20, 21, 22, and 23 placed at the four corners of the cabinet. Securely stretched over the surface of these rollers is a flexible, endless screen 24 formed of any suitable fabric or flexible material and upon which is depicted the advertising matter which it is desired to exhibit. In order to move this screen so as to exhibit different portions of the same there is provided a roller element 25 mounted in the upper front corner of the cabinet and equipped with a gear 26 which meshes at all times with a similar gear 27 provided on roller 20.

In order to keep the rollers 20 and 25 in close engagement so as to provide a tractive effort on the screen 24, there is arranged a bracket 28 mounted on the front wall 11 of the cabinet and enclosing a compressed spring 29 which acts constantly to force the axle 30 of roller 25 into contact with screen 24. This construction is set forth in Fig. 5 and it is contemplated that a similar arrangement will be used at the upper left hand corner of the cabinet.

To enable one to move screen 24 to any desired position a handle 31 is mounted in the upper corner of end wall 12 and connected with roller 25 so that by turning 31 the rollers 25 and 20 will be rotated thus drawing the screen between them. Guides 32 are provided on rollers 21, 22, and 23 on each side of screen 24 to prevent the screen from slipping to one side of the rollers.

The path of movement of the screen lies between the speaker element 4 and the element 17 which is fastened to the front wall of the cabinet. The shape of element 17 serves to direct the sound emanating from the speaker and also serves to set out the advertising screen in an attractive manner. It is contemplated that the screen 24 will be illuminated by the light of tubes 5 or if necessary, a separate pilot light may be added to the radio set for this purpose without departing from the scope of the invention. Any suitable source of illumination of requisite intensity, may be provided for illuminating the advertising matter contained on the screen or walls of the cabinet. It is obvious that colored or painted screens or walls may be used for the purpose of enhancing the advertising appeal.

It will be noted that since the radio set is supported by the elevated platform 18 the screen is free to move beneath said support. Moreover, due to the omission of the many external connections from the radio set, which of course is a direct result of the use of the pretuned set, no interference with the movement of screen 24 is experienced. The single external connection 6 lies above platform 18 and in no way interferes with screen 24.

A further modification is depicted in Fig. 6 in which the radio set is shown resting on the bottom of the cabinet and having the single, external connection 6. The cabinet comprises the removable front panel 41, an end wall 42 having a single, small aperture for all of the external connections of the radio set and a hinged lid or top 43. Channels 44 are provided in the end walls of the cabinet for the reception of the removable panel 41. Affixed to the inside of panel 41 in any suitable manner is the member 45 bearing on its surface such advertising matter as is desired to be shown.

The top 43 may be hinged at the rear of the cabinet in any conventional manner and may be fastened securely to the end walls by any suitable means, such as by bolts, screws, glue or solder, after panel 41 has been placed in position.

It will be noted at once that in each of the cabinets shown, the advertising screen presents a neat, unbroken external surface. This feature is of importance since with the conventional radio cabinet, embodying as it does a plurality of external connections, the advertising screen would be marred by a number of unsightly openings. The cabinets illustrated by this invention are totally enclosed thus shielding the enclosed receiving set from dirt and moisture and preventing unwarranted tampering with the connections. The cabinets used in accordance with this invention will be sealed at the factory and will have definite advertising matter and a radio set with a definite tuned circuit placed therein before they are distributed to the user.

Since the cabinet is designed primarily to provide a medium through which a definite advertising project may be carried out, the same will find its greatest utility in metropolitan areas in which are located the large broadcasting stations. Within a radius of several miles reception by means of the pretuned set will be quite satisfactory. It is therefore apparent that a cabinet such as shown provides the solution to the problem of insuring a definite audience for any certain station. Furthermore, the use of an advertising means such as shown will be of mutual benefit to the public, the advertiser and the broadcasting station. In order to hold the attention of the listener a good class of programs will be provided. In return, the broadcasting station having the assurance that a definite audience is listening to the program will be able to sell its broadcasting time at higher rates. Similarly, the advertiser benefits in that his advertising appeal is reaching a definite audience and is being placed before that audience in a coordinated visual and audible manner.

Having disclosed the preferred form of the invention and having described the useful cooperation between the cabinet, the advertising matter which it bears and the pretuned radio set which it encloses, it is obvious that the same cooperation may be embodied in cabinets of different designs without departing from the scope of the invention and it is my intention to cover by the appended claims such changes as may be reasonably included within the scope thereof.

What is claimed is:

1. In combination, a radio receiving set having one or more external connections, a cabinet housing said set, an endless movable screen housed within the cabinet and bearing advertising matter upon its surface, a cabinet wall apertured to permit the passage of sound from said cabinet, roller means at the junctures of the cabinet walls for moving the screen past the apertured wall, means for actuating said roller means, guides for directing the movement of the screen over the roller means and means disposed within the cabinet and supporting the radio set out of the path of movement of said screen.

2. An advertising means providing an audible and a visual advertising appeal, comprising in combination, a cabinet having an apertured front wall, an endless movable screen bearing advertising matter on its surface, means supporting the screen at spaced points within the cabinet, means for moving the screen over said supporting members and past the apertured wall, a radio receiving set positioned in the cabinet and adapted to receive a program mentioning the products referred to on said screen and means supporting the receiving set inside the path of movement of said screen.

3. In a radio advertising means, the combination of a pretuned radio receiving set, said set being adjusted for the broadcast program of a predetermined commercial broadcasting station, a radio cabinet having an apertured front wall, an endless movable screen bearing visual advertising matter on its surface and referring to products mentioned by the broadcast program, means supporting the screen at spaced points within the cabinet, actuating means for moving the screen over the supporting means and past the apertured wall and means supporting the receiving set inside the path of movement of said screen.

STANLEY E. SLOSS.